United States Patent [19]

Heitmann et al.

[11] 4,169,915

[45] Oct. 2, 1979

[54] FIRE RESISTANT FOAM PRODUCTS

[75] Inventors: Glenn A. Heitmann, Morrison; Milton F. Trosper, Jr., Littleton, both of Colo.

[73] Assignee: Johns-Manville Corporation, Denver, Colo.

[21] Appl. No.: 895,567

[22] Filed: Apr. 12, 1978

Related U.S. Application Data

[63] Continuation of Ser. No. 729,499, Oct. 4, 1976, abandoned.

[51] Int. Cl.$^2$ ................................................ B32B 3/26
[52] U.S. Cl. .................................... 428/310; 521/122; 521/903; 428/212; 428/313; 428/425; 428/921
[58] Field of Search ................ 521/122, 903; 428/212, 428/218, 310, 313, 315, 425, 446, 921

[56] References Cited

U.S. PATENT DOCUMENTS

| | | | |
|---|---|---|---|
| 3,096,196 | 7/1963 | Bettoli et al. | 428/489 |
| 3,174,887 | 3/1965 | Voelker | 156/79 |
| 3,451,842 | 6/1969 | Kurz et al. | 428/425 |
| 3,565,746 | 2/1971 | Stevens | 428/315 |
| 3,625,872 | 12/1971 | Ashida | 521/122 |
| 3,802,950 | 4/1974 | Stevens | 428/310 |
| 3,962,154 | 6/1976 | Egli | 521/143 |

*Primary Examiner*—William J. Van Balen
*Attorney, Agent, or Firm*—Robert M. Krone; Joseph J. Kelly; James W. McClain

[57] ABSTRACT

A heat resistant foamed material is disclosed, comprising a cellular foamed resin having associated therewith talc in sufficient quantity to provide enhanced fire resistance to the foam. In various embodiments the talc may be incorporated throughout the foam, concentrated at or near the surface of the foam, incorporated in a facing for the foam which facing comprises a mat (preferably of glass fiber) impregnated with talc, or incorporated into a coating, such as asphalt, with which the facing for the foam is impregnated. The heat resistant faced or unfaced foams incorporating talc are useful as thermal insulations for buildings, particularly for building roofs.

18 Claims, No Drawings

FIRE RESISTANT FOAM PRODUCTS

This is a continuation of application Ser. No. 729,499, filed Oct. 4, 1976, now abandoned.

BACKGROUND OF THE INVENTION

The invention herein relates to cellular plastic foams.

Cellular plastic foams, such as phenolic and polyurethane foams, exhibit various degrees of heat resistance. However, for each foam there is a point at which heat (as from an adjacent fire) begins to degrade the foam by softening the plastic and collapsing the cellular structure, warping blocks made of the foams, or burning the resin material. Such foams are frequently used as thermal insulations for buildings. However, their relatively low resistance to fire (heat) normally causes them to have rather low fire ratings as building materials. These low ratings in turn may prohibit use of the foams where fire code requirements are relatively stringent, or require builders to use supplemental means to obtain the necessary degree of fire resistance in buildings to comply with the fire codes.

It would be of advantage in many situations to have foams which have higher degrees of fire retardance and resistance such that foam insulations could be used more widely and there would be less need for supplemental fire retardant means.

BRIEF SUMMARY OF THE INVENTION

The invention herein comprises a heat resistant foamed material comprising a cellular foamed resin having associated therewith talc in an amount sufficient to increase the heat resistance of the resin.

In one embodiment, the invention comprises a heat resistant foamed material comprising a cellular foamed resin having talc incorporated therethrough.

In another embodiment the invention comprises a heat resistant foamed material comprising a cellular foamed resin body having applied to at least one face thereof a facing comprising a mat, preferably glass fiber, having talc incorporated into said mat.

In yet another embodiment the invention comprises a heat resistant material comprising a cellular foamed resin body containing talc incorporated into the resin and concentrated at or near the surface of the resin body.

In yet another embodiment the invention comprises a heat resistant material comprises a cellular foamed body having on at least one face thereof a facing with talc incorporated into a coating applied to or impregnated through the facing.

DETAILED DESCRIPTION AND PREFERRED EMBODIMENTS

The invention herein is based on the discovery that talc can significantly enhance the heat and fire resistant properties of cellular foamed resins, often to the point where articles made of such resins, such as building insulations, can pass stringent building fire code requirements. The reason why talc provides such enhancement of heat resistance is not known, but it is believed that the platey nature of the talc particles serves to reflect heat impinging on the foam body, thus lessening the effect of the heat and permitting the foam body to withstand the heat for significantly longer periods of time.

In a first embodiment the invention comprises a foamed material comprising a cellular foamed resin having talc incorporated therethrough. The talc will normally be incorporated into the resin while the latter is in a liquid or plastic state prior to being foamed. The talc may be incorporated into the resin in the same manner, for example dispersing, that one incorporates other types of additives into a resin prior to foaming. The talc will be present throughout the resin in a total amount of from about 5 to about 100 parts by weight per 100 parts by weight of the resin (hereinafter abbreviated "phr").

In another embodiment the invention comprises a heat resistant foamed material comprising a cellular foamed resin body with talc incorporated therein but concentrated at or near at least one surface of the foamed resin body. Normally if talc is concentrated on only one face of the body it will of course be on the face which will ultimately be the one likely to be exposed to heat. The talc will be present in the area of surface concentration as about 5 to 100 phr, based on resin amount in the same area.

In another embodiment the invention comprises a heat resistant foam material comprising a cellular foamed resin body and having applied to at least one face thereof a facing comprising a mat, preferably of glass fiber, the mat having talc incorporated therein. The talc will be present as from 0.1 to 0.5 parts by weight per part by weight of mat. The talc may be incorporated physically merely by filling the interstices of the mat with the talc. The talc-filled mat and the foam can be formed separately and then adhered together or the talc filled mat can be formed first and the resin foamed in contact with the mat so that foaming and adhesion occur simultaneously.

In yet another embodiment the invention comprises a heat resistant foam material comprising a cellular foamed resin body having applied to at least one face thereof a facing, the facing comprising a coating, usually with a base of asphalt or resin, with the coating having talc incorporated therein in an amount of about 5 to 400 parts by weight per 100 parts by weight of the base material of the coating (hereinafter abbreviated "phc").

In still another embodiment the invention comprises a heat resistant foam material comprising a cellular foamed resin body having applied to at least one face thereof a facing comprising a sheet material, preferably a glass fiber mat, with a coating thereon or impregnated therethrough and talc incorporated into the coating in an amount of 50 to 400 phc. The base material of the coating typically is asphalt if the foam body is to be used for a roof insulation.

The foam materials of the present invention may be any of the many types of cellular foamed resins. Typical resins which may be foamed include styrene, acrylonitrile-butadiene-styrene, polyolefins, phenolics, silicones, urethanes and vinyls. This list is of course not meant to be limiting but merely illustrative. Descriptions of typical foamable resins are found widely throughout the literature; such descriptions of the above resins are for example found in the 1970–1971 *Modern Plastics Encyclopedia* beginning at page 237. Two other resin types of interest are the isocynurates (described in U.S. Pat. No. 3,814,659) and the carbodiimides (described in U.S. Pat. Nos. 3,502,722 and 3,891,578). Both open-cell and closed-cell foamed resins may be used. In view of the knowledge of those skilled in the art and the numerous descriptions in the literature, more detailed description of the various material resins need not be given here.

The talc useful in the present invention may be any commercial talc. Talc is a platey hydrous magnesium silicate material found widely in deposits throughout the world. As with any naturally accurring material, talcs from various deposits will have varying degrees of purity and will be mixed with various types of associated minerals. However, methods for purifying raw talc to a commercial degree of purity, such as flotation, are well known.

On occasion talc appears in association with acicular crystalline minerals, such as tremolite. Mixtures of the platey talc and the associated acicular minerals are often sold as so-called "fiberous talc". However, because the platey nature of talc is believed to be critical for the present invention, the platey talc should be separated from these associated acicular minerals to the greatest extent possible.

There will commonly be other materials or additives present in the foamed resin. These will include blowing agents, colorants, anti-oxidants, ultraviolet inhibitors, and the like. These are all materials conventionally associated with foamed resins and their use in conventional amounts may be as desired by the formulator. It will of course be understood that the particular materials for such additives must be chosen so as not to react adversely with the talc and/or substantially reduce the platey nature of the latter.

The preferred base for the facing in certain embodiments of the present invention may be any woven or felted mat of glass fibers. (As used herein the term "mat" includes mats, felts, woven fabrics or any other thin sheet-like assembly of glass fibers.) The mat will normally be on the order of from 1 to 50 mils (0.02 to 1.27 mm) in thickness, preferably from about 10 to 20 mils (0.25 to 0.51 mm). The choice of a mat thickness will depend on the degree of strength and dimensional stability which it is desired to impart to the foam by the facing, as well as by factors such as whether or not the facing is to be applied to one or both major surfaces of a foam body.

The glass mat will have a weight of from about 0.5 to 3.5 lbs per 100 ft$^2$ (2.4 to 17.0 kg/per 100 m$^2$), preferably a weight on the order of from 0.7 to 2.0 lbs per 100 ft$^2$ (3.4 to 9.7 kg/per 100 m$^2$). The invention is particularly adaptable to use with a glass mat of the type manufactured by the Johns-Manville Corporation and made as a felted mat from a diluted water slurry of glass fibers. In such mats the glass fibers normally have diameters on the order of 12 $\mu$m to 20 $\mu$m in diameter, and a length on the order of 0.5 to 2.5 inches (12 mm to 65 mm), although neither length nor diameter is absolutely critical. Of course where a woven fabric is used instead of a felted mat, the fiber length will essentially be continuous although the fiber diameters will be on the order of the diameters of the short fibers used for felts.

While the preferred facing base is a sheet material or "mat" of glass fiber (and is used for illustrative purposes here), it will be recognized that other sheet materials, such as mats composed of synthetic organic fibers, may also be used.

The mat facing normally will be coated or impregnated with a material such as asphalt, polyethylene, polypropylene and similar polymeric or resinous materials. Such coatings are normally applied to the mat in amounts from about 0.3 to about 1.5 lbs per 100 ft$^2$ of mat (2.4 to 7.2 kg per 100 m$^2$ of mat). However, depending upon the material greater or lesser quantities may be used, for the appropriate amount will be that necessary to seal the pores of the glass mat such that the resin will not "bleed through" prior to or during foaming if the resin is foamed in contact with the mat. Similarly, if the resin is foamed separately and subsequently adhered to the mat, the pores of the mat should be sufficiently sealed that the adhesive material does not bleed through the mat.

The talc will be incorporated directly into the coating asphalt or resin and the talc-filled coating thereafter applied to the mat. The talc is incorporated directly into the asphalt or resin in a manner (such as stirring or dispersing) similar to that used to incorporate other types of additives into an asphalt or resin prior to coating onto the mat.

If the mat is to be used as the facing without any separate coating, the talc must be incorporated into the foamed resin body itself or put into the mat itself. In the latter case the mat must be relatively impervious such that the talc particles will be retained after being forced into the interstices of the mat.

The present invention is illustrated by the following examples, in which it is clearly shown that materials made in accordance with the present invention have significantly greater fire resistance than do similar materials not incorporating talc.

EXAMPLE 1

A foamed body was made of extruded polystyrene foam of 2 lb/ft$^3$ ("pcf") density. An uncoated Johns-Manville commercial non-woven glass fiber mat of the type described above was bonded to the surface of the foam. Upon exposure to a flame from a laboratory burner for just a few seconds the faced foam body burned rapidly with an open flame.

Thereafter a similar foamed polystyrene body was formed, but this time was faced with the same type of glass mat which had been coated with asphalt into which about 270 phc of talc (based on asphalt) had been incorporated. Exposure of this material to the same burner flame for 15 minutes showed only some evaluation of combustible gases from pyrolysis, but no resin dripping or flame propogation in the resin.

EXAMPLE 2

A 12"×12" phenolic resin foam body was made using 3 pcf foam. This was subjected to the ASTM E-119 firewall test, and failed after 7 minutes. A similar phenolic foam body, but containing 5 phr talc incorporated therethrough, lasted 9½ before failure in the same test.

EXAMPLE 3

A 1¼" thick polyurethane resin foamed body was formed of 2 pcf polyurethane foam. When exposed to a Bunsen burner flame the body ignited in less than 1 second, burned through in 70 seconds, and took 30 seconds to self-extinguish after the flame was removed. A similar polyurethane foam body, but which had its surface pores filled with talc, took 5 seconds to ignite, 92 seconds to burn through, and only 15 seconds to self-extinguish after flame removal.

What we claim is:

1. A heat resistant foamed material comprising a cellular foamed resin body having talc incorporated therein, with said talc being concentrated at or near at least one surface of said material, said talc being present as about 5 to 100 phr in the area in which it is concentrated, based on the amount of resin in said area of talc concentration.

2. A heat resistant foamed material as in claim 1 wherein said cellular foamed resin is a phenolic resin.

3. A heat resistant foamed material as in claim 1 wherein said cellular foamed resin is a polyurethane resin.

4. A heat resistant foamed material as in claim 1 wherein said cellular foamed resin is a polyisocyanurate resin.

5. A heat resistant foamed material comprising a cellular foamed resin body having applied to at least one face thereof a facing comprising a mat having incorporated therein talc in an amount of 0.1 to 0.5 parts by weight per part by weight of said mat.

6. A heat resistant foamed material as in claim 5 wherein said mat is composed primarily of glass fibers.

7. A heat resistant foamed material as in claim 6 wherein said cellular foamed resin forming said body is a phenolic resin.

8. A heat resistant foamed material as in claim 6 wherein said cellular foamed resin comprising said body is a polyurethane resin.

9. A heat resistant foamed material as in claim 6 wherein said cellular foamed resin comprising said body is a polyisocyanurate resin.

10. A heat resistant foamed material as in claim 6 wherein said talc is distributed throughout the interstices of said mat.

11. A heat resistant foamed material as in claim 6 wherein said mat comprises glass fibers having thereon a coating comprising a base material with said talc distributed throughout said coating.

12. A heat resistant foamed material as in claim 11 wherein said mat is composed primarily of glass fibers.

13. A heat resistant foamed material as in claim 12 wherein said talc is present in said coating as 50 to 400 phc based on the base material of said coating.

14. A heat resistant foamed material as in claim 12 wherein that base material of said coating comprises asphalt.

15. A heat resistant foamed material as in claim 12 wherein the base material of said coating comprises a polymeric resin.

16. A heat resistant foamed material as in claim 1 comprising a board having thermal insulating properties.

17. A heat resistant foamed material as in claim 5 comprising a board having thermal insulating properties.

18. A heat resistant foamed material as in claim 11 comprising a board having thermal insulating properties.

* * * * *